(12) United States Patent
Sahu et al.

(10) Patent No.: US 8,913,184 B1
(45) Date of Patent: Dec. 16, 2014

(54) SYSTEMS AND METHODS FOR DETERMINING VIDEO FIELD SHARPNESS

(75) Inventors: Shilpi Sahu, Karnataka (IN); Panikumar Gururaj Kallamballe, Karnataka (IN); Sujith Srinivasan, Karnataka (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/554,042

(22) Filed: Jul. 20, 2012

Related U.S. Application Data

(60) Provisional application No. 61/510,163, filed on Jul. 21, 2011.

(51) Int. Cl.
*H04N 7/01* (2006.01)
*H04N 11/20* (2006.01)
*G06K 9/36* (2006.01)
*G06K 9/46* (2006.01)
*G06K 9/00* (2006.01)
*G06K 9/32* (2006.01)

(52) U.S. Cl.
USPC .......... 348/441; 348/448; 348/449; 348/452; 382/239; 382/170; 382/300

(58) Field of Classification Search
None
See application file for complete search history.

(56) References Cited

U.S. PATENT DOCUMENTS

| | | | |
|---|---|---|---|
| 4,567,610 A * | 1/1986 | McConnell | 382/170 |
| 7,733,421 B1 | 6/2010 | Sahu et al. | |
| 8,055,102 B1 * | 11/2011 | Sahu | 382/300 |
| 2002/0135697 A1 * | 9/2002 | Wredenhagen et al. | 348/448 |
| 2002/0181791 A1 * | 12/2002 | Kuniba | 382/239 |
| 2007/0030384 A1 * | 2/2007 | Wredenhagen et al. | 348/449 |
| 2008/0106642 A1 * | 5/2008 | Srinivasan et al. | 348/452 |
| 2011/0013081 A1 * | 1/2011 | Wredenhagen et al. | 348/449 |

* cited by examiner

*Primary Examiner* — Jefferey Harold
*Assistant Examiner* — Sean Haiem

(57) ABSTRACT

Systems and methods are provided for detecting sharpness among video fields. In certain implementations of the systems and methods, a plurality of video fields is received and a sharpness metric for each of the plurality of video fields is determined. The sharpness metric of a first video field is compared to the sharpness metric of a second video field among the plurality of video fields and a video field source of the first video field and the second video field is determined based on the comparison.

20 Claims, 6 Drawing Sheets

SYSTEMS AND METHODS FOR DETERMINING VIDEO FIELD SHARPNESS

CROSS-REFERENCE TO RELATED APPLICATION

This application claims the benefit under 35 U.S.C. §119 (e) of U.S. Provisional Application No. 61/510,163 filed Jul. 21, 2011, which is hereby incorporated by reference herein in its entirety.

FIELD OF USE

The present disclosure relates generally to video processing systems and methods, and more particularly, to systems and methods for determining the sharpness of video fields of a video.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Digital video may be produced using different types of video capture devices, such as film and video cameras; however each device may capture the digital video in different formats. Film cameras may capture digital video in a progressive video format at a certain frame rate. Video cameras on the other hand may capture in an interlaced video format at a certain field rate. The difference between capturing in interlaced or progressive is that when capturing in interlaced format, each field only contains half the number of pixels, meaning that half of the frame's pixels are lost for that time instance of the field.

Whichever way the digital video is captured, the video needs to be displayed. A video processor is used to process the captured video and provide it to a display. Many modern displays display in progressive format, so the video processor would typically process the captured video into progressive format before providing it to the display. If the captured video source is in interlaced format, the video processor would perform interpolation to generate the missing pixels in each frame to produce progressive frames. The generated pixels are generally of lower quality than the original captured video pixels. If the capture video source is progressive, a form of upsampling may occur. However the frames use the same pixels from the original captured video source. Therefore, no pixels need to be generated, and the pixels are generally of the same quality as the original video.

When the display receives the video from the video process, it may decide to re-process the video using its own video processor contained within it. The previous video processor which processed the video may have produced inferior quality video than that which the video processor within the system may be able to produce. However, in order to process the received video, the video processor in the display should know the original source of the video because depending on the video source, whether it is film or video, the video processor may want to process the video differently.

SUMMARY OF THE DISCLOSURE

In accordance with an embodiment of the disclosure, methods are provided for detecting sharpness among video fields.

In certain implementations, a plurality of video fields is received and a sharpness metric for each of the plurality of video fields is determined using video processing circuitry. The video processing circuitry, compares the sharpness metric of a first video field to the sharpness metric of a second video field among the plurality of video fields and determines a video field source of the first video field and the second video field based on the comparison.

In certain implementations, the determination of the sharpness metric includes determining for at least one pixel in each of the plurality of video fields, an edge magnitude value, generating a cumulative edge magnitude histogram for each of the plurality of the video fields, based on the edge magnitude value of the at least one pixel in each of the plurality of video fields, and determining a sharpness metric based on the cumulative edge magnitude histogram for each of the plurality of video fields.

In certain implementations, the determination of the video field sources includes determining a sharpness metric pattern based on the sharpness metric for each of the plurality of video fields and determining the video field source based on the sharpness metric pattern.

In accordance with another embodiment of the disclosure, a system is provided for detecting sharpness among video fields. The system includes video receiving circuitry configured to receive a plurality of video fields, sharpness metric circuitry configured to determine a sharpness metric for each of the plurality of video fields, and video field source circuitry configured to compare the sharpness metric of a first video field to the sharpness metric of a second video field among the plurality of video fields, and determine a video field source of the first video field and the second video field based on the comparison.

In certain implementations, the sharpness metric circuitry is further configured to determine for at least one pixel in each of the plurality of video fields, an edge magnitude value, generate a cumulative edge magnitude histogram for each of the video fields, base don the edge magnitude value of the at least one pixel in each of the plurality of video fields, and determine a sharpness metric based on the cumulative edge magnitude histogram for each of the plurality of video fields.

In certain implementations, the video field source circuitry is further configured to determine a sharpness metric pattern based on the sharpness metric for each of the plurality of video fields, and determine the video field source based on the sharpness metric pattern.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative embodiments will now be described. However, the systems and methods described herein may be adapted and modified as is appropriate for the application being addressed and that the systems and methods described herein may be employed in other suitable applications, and that such other additions and modifications will not depart from the scope hereof.

The present disclosure provides system and methods for detecting and determining an original source of a received video. In certain embodiments of the disclosure, video fields of the received video may be processed and a quality, such as a sharpness, of the video fields may be determined. By comparing the quality or sharpness of the video fields of the video, the original source of the video and video fields may be determined. By determining the original source of the video and of the video fields, a video processor may determine whether to process the video fields to improve the quality of the video.

Figure 1A:
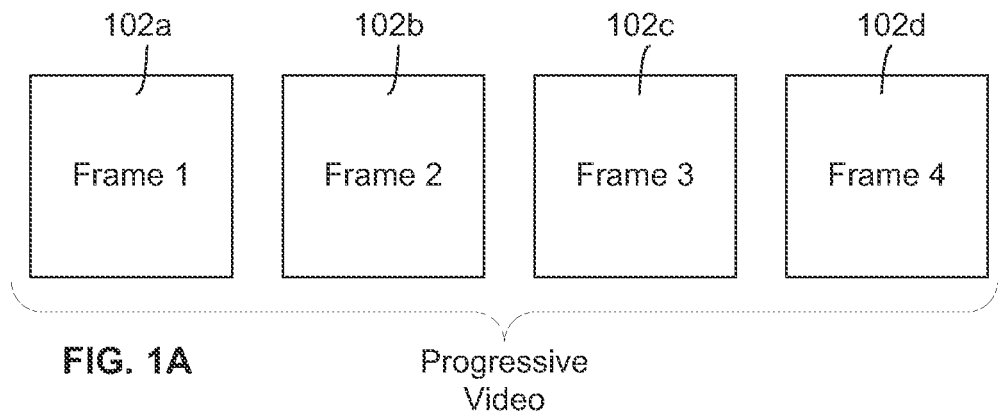
FIGS. 1A-C show examples of different video formats according to an embodiment of the present disclosure.
Figure 1B:
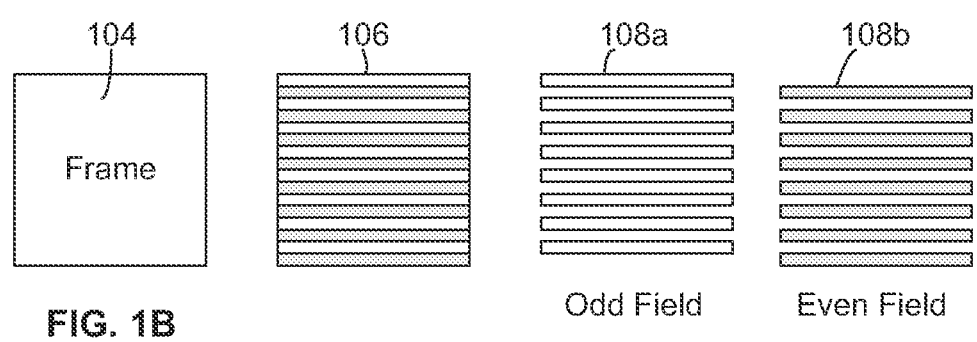
Figure 1C:
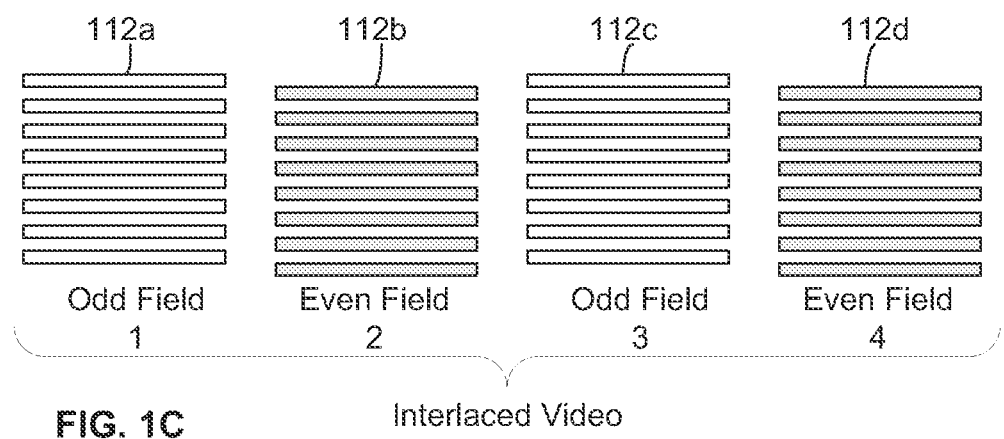

FIGS. 1A-C show examples of different video formats according to an embodiment of the present disclosure. There are two different video formats which digital video is created, stored, and transmitted in: progressive video and interlaced video. Progressive video refers to video where each pixel of a video frame is refreshed every frame. As shown in FIG. 1A, multiple frames 102a-d are displayed one after another to form a video. Each new frame contains a set of pixels which span the entire frame. An example of progressive video is 1080p, which refers to progressive video where each frame is 1920 columns by 1080 lines of pixels.

The pixels in a frame 104 may also be displayed in a different way, as shown in FIG. 1B. Instead of refreshing every pixel in a frame 104 each instance, interlaced video refreshes half of the pixels each instance. Instead of frames 104, interlaced video refers to each set of pixels as fields. A video frame 106 may be decomposed into two sets of fields: an odd 108a and even 108b field. Odd fields 108a may include a first set of lines of pixels of a frame 106, and even field 108b may include a second set of lines of pixels of frame 106. The first and second set of lines represent different lines of the frame. In certain instances, the first set of lines represents alternating lines of frame 106 starting from the first line of frame 106, and the second set of lines represents the other set of alternating lines of frame 106 starting from the second line of frame 106. An example of interlaced video is 1080i, which refers to interlaced video where each interlaced video frame, known as an interlaced video field, has half the number of pixels as 1080p. In 1080i, an interlaced video field is 1920 columns by 540 lines of pixels, instead of a progressive frame of 1920 columns by 1080 lines of pixels.

FIG. 1C shows multiple fields of an interlaced video 112a-d. Instead of refreshing every pixel each instance, interlaced video only refreshes half of the pixels. By alternating between odd fields 112a and 112c and even fields 112b and 112d, a full frame 106 is displayed every two fields.

Digital video may be produced using different types of video capture devices, such as film and video cameras, however each device may capture the digital video in different formats. Film cameras may capture digital video in a progressive video format at a certain frame rate. Video cameras on the other hand may capture in an interlaced video format at a certain field rate. The difference between capturing in interlaced or progressive is that when capturing in interlaced format, since each field only contains half a number of pixels, half of a frame's pixels are lost for that time instance of the field.

Whichever way the digital video is captured, the video needs to be stored, transmitted, or displayed. In many cases there may be a set format which the video is converted into before being stored, transmitted, or displayed. For example, in certain cases, video may be stored in interlaced format. If the source video is from a film camera (progressive), each progressive frame of the video is separated into odd and even fields in order to convert the frames into interlaced fields. The converted interlaced fields are then duplicated in a specific pattern to match a required frame rate. Though the progressive frames have been converted into interlaced fields, all of the pixels in the frames are from the original frames. If the source video is from a video camera (interlaced), it is already in the correct format to be stored. However, processing may need to be done on the video to match the frame rate required. The processed interlaced fields from the video camera source may have lower quality and be softer (not as sharp) than the original fields.

After the video is stored in the set format, the video may eventually be displayed or transmitted to a display. Many modern displays display in progressive format. Therefore, the stored video may be converted from interlaced format into progressive format, known as de-interlacing. A de-interlacer, which performs the de-interlacing, should first determine whether incoming fields are from a film source or a video source and then use appropriate de-interlacing algorithm to produce the progressive video for display. For the film source case, the progressive frame can be generated by copying appropriate neighboring fields together (referred to as weaving). Since the fields of the stored video were generated from the original progressive frames of the film source, the sharpness and quality of the video de-interlaced video is nearly the same, if not the same, as the original film source.

For the video source case, the progressive frame is generated by interpolating the existing fields. Because the interlaced fields of the video source contain only a portion of the pixels of a progressive frame for each time instance, interpolation is performed to generate missing pixel information of the fields to generate the progressive frame. Due to the interpolation, the generated field is softer (not as sharp) and the quality is not as good as the originally captured fields of the video source.

The display system may receive the de-interlaced progressive video. However, when the display system receives the de-interlaced progressive video, it may decide to re-process the de-interlaced video using its own video processor contained within it. The previous de-interlacer may have produced inferior quality progressive video than the video processor within the system may be able to. Therefore, in order to re-process the received video, the video processor may identify the original video source of the received video. By identifying the original source, the video processor may be able to identify and re-process the original frames or fields of the original source video to produce the improved quality video.

Figure 2:
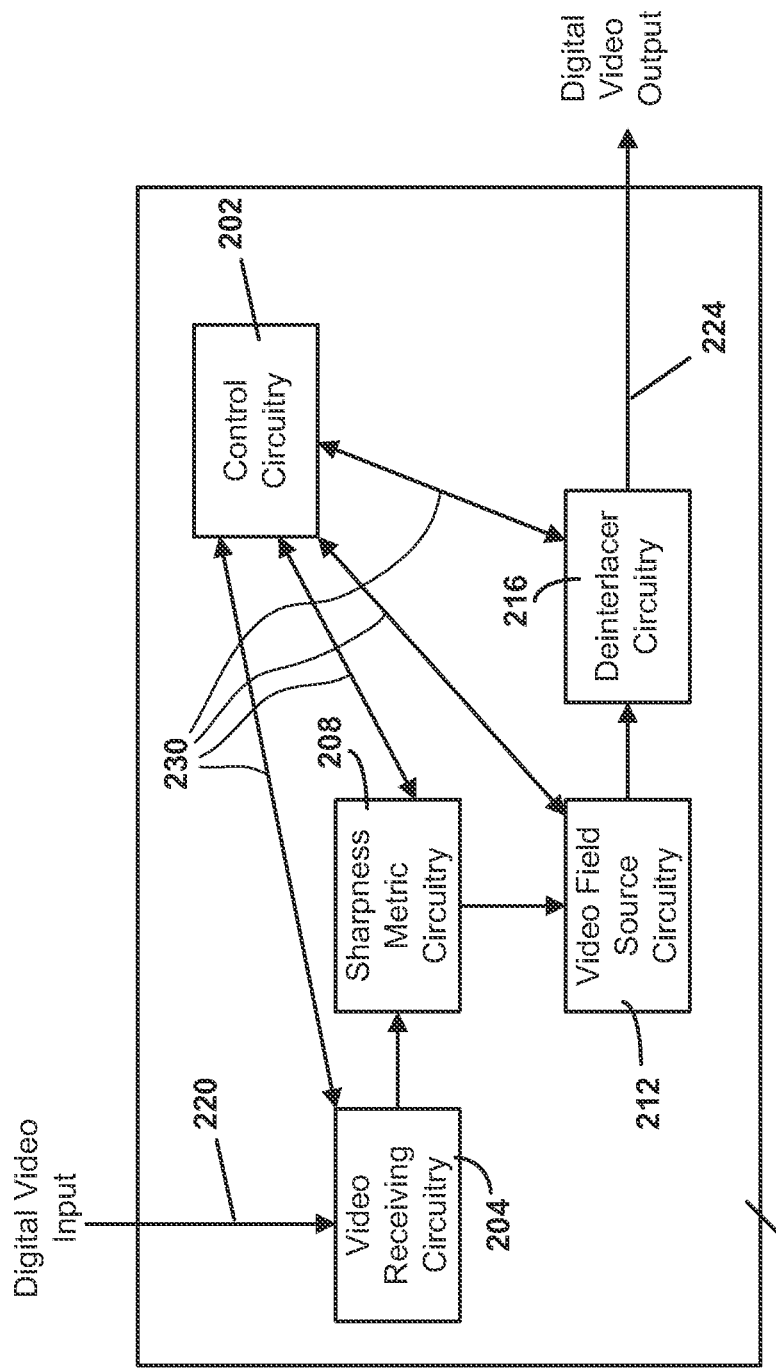
FIG. 2 shows an example of video processing circuitry according to an embodiment of the present disclosure.

FIG. 2 shows an example of video processing circuitry 200 according to an embodiment of the present disclosure. Video processing circuitry 200 may be configured to determine the original video source of a received digital video input 220. Video processing circuitry 200 may include control circuitry 202 which generates control signals 230 to operate and configure the circuitry within video processing circuitry 200.

Processes and operations performed by video processing circuitry 200 and circuitry within may be implemented using control circuitry 202. Video processing circuitry 200 receives digital video input 220 using video receiving circuitry 204. The digital video input 220 may either be in interlaced or progressive video format. Depending on the video format, video receiving circuitry 204 determines the video fields from digital video input 220. For example, if digital video input 220 is progressive, each progressive video frame of the video has two video fields: an odd and an even field, also known as polarities. The odd field includes odd lines of the video frame and the even field includes even lines of the video frame. If digital video input 220 is interlaced, each interlaced video frame has only one video field and each sequential video frame of the interlaced video alternates in polarity.

Each video field is provided to and processed by sharpness metric circuitry 208. Sharpness metric circuitry 208 determines a sharpness metric for each of the video fields and provides the sharpness metrics to video field source circuitry 212. Based on the sharpness metric for each video field, video field source circuitry 212 determines the video source of digital video input 220. The determined source of the video fields of the digital video input may then be provided to de-interlacer circuitry 216 for de-interlacing. Examples of de-interlacing circuitry, their features, and various implementations, are described in greater detail in U.S. patent Publication Ser. No. 11/932,686, filed Oct. 31, 2007, and U.S. Pat. No. 8,055,102, filed Oct. 30, 2007 and U.S. Pat. No. 7,733,421, filed Dec. 5, 2005, which are hereby incorporated herein by reference in their entirety.

Figure 3:
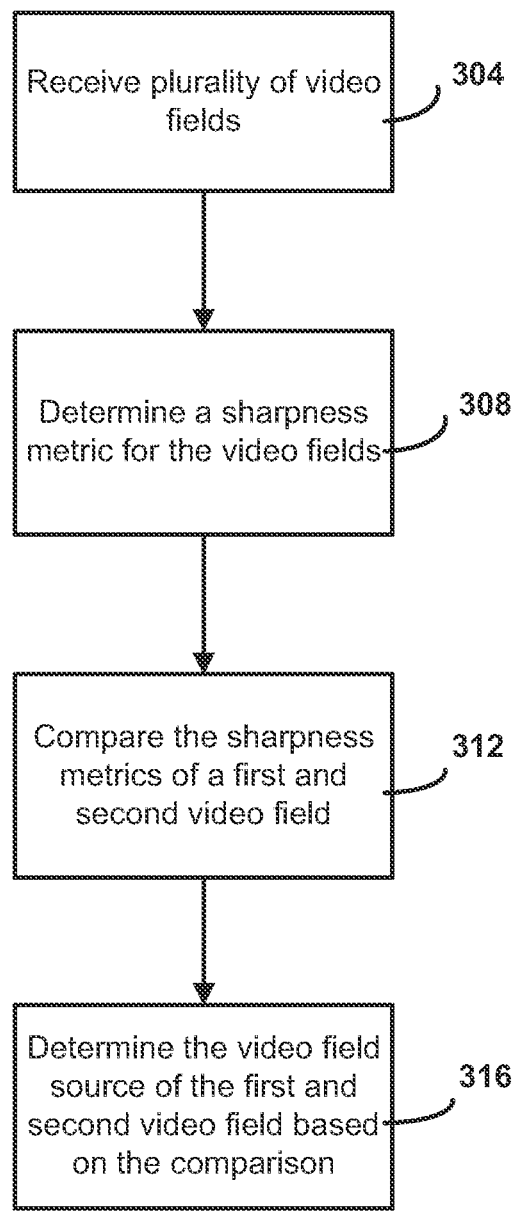
FIG. 3 shows an illustrative process for determining a video field source of a video field according to an embodiment of the present disclosure.

FIG. 3 shows an illustrative process 300 for determining a video field source of a video field according to an embodiment of the present disclosure. At 304, video receiving circuitry 204 may receive digital video input 220. Digital video input 220 may be of either interlaced or progressive video format. If digital video input 220 is interlaced, then each of the frames of the interlaced video includes an interlaced video field. The interlaced video fields alternate sequentially between odd and even fields. However, if digital video input 220 is progressive, then each of the frames of the progressive video includes multiple video fields. For example, a progressive video frame may include both an even and an odd field. The set of video fields in either the interlaced or progressive video are received by video receiving circuitry 204.

At 308, sharpness metric circuitry 208 receives the video fields and sharpness metrics are determined for the video fields. A sharpness metric indicates the sharpness of a video field. In certain embodiments, a sharpness metric for each of the video fields of the video may be determined. In certain embodiments, the sharpness metric for a select set of video fields may be determined. For example, if digital video input 220 is progressive, sharpness metrics may be determined for the odd and even fields of a selected frame of the video. If digital video input 220 is interlaced, two sequential interlaced video fields may be selected and sharpness metrics may be determined for the selected interlaced video fields. Though examples are described for determining sharpness metrics for select video fields, a sharpness metric may be determined for any combination or sequence of video fields or video frames of the video. The determined sharpness metrics are provided to video field source circuitry 212.

At 312, video field source circuitry 212 compares the sharpness metrics of the video fields. Based on the comparison of the sharpness metrics of the video fields, at 316, video field source circuitry 212 determines the video source of the video fields. For example, if based on the sharpness metrics, the compared video fields are determined to be equally sharp, the video fields of the video may be determined to be of good quality. This means that video fields may be from the original video source, such as a film camera source. If the video was captured using a film source, the video fields of the received input video 220 would be based on the original video frames of the video source. In this case, the de-interlacer may not have to process and de-interlace the video fields again, since the video fields are either of good quality similar to the original source video, or the video was de-interlaced properly.

However, if the sharpness metrics of the compared video fields are different, then one of the video fields may be determined to be generated using interpolation or de-interlaced improperly. The interpolated or generated video field may result in a softer and less sharp video field than video fields of the source video. For example, the source of the video may be from a video camera source, and interpolation may have been performed to generate certain video fields of the video. The generated video fields may be detected and the original or sharper video fields may be identified. These identified video fields may then be provided to de-interlacer circuitry 216 to be processed and de-interlaced to produce higher quality and sharper video fields.

Figure 4:
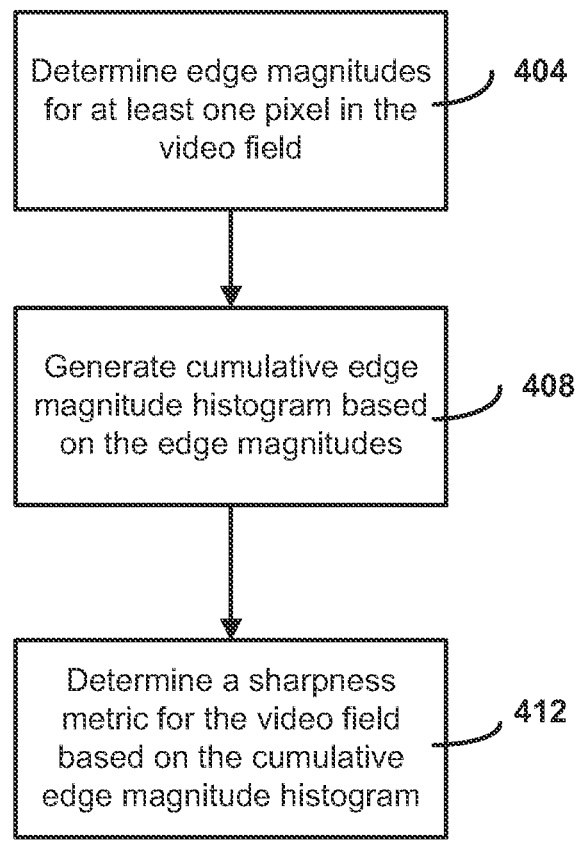
FIG. 4 shows an illustrative process for determining a sharpness metric for a video field according to an embodiment of the present disclosure.

FIG. 4 shows an illustrative process 400 for determining a sharpness metric for a video field according to an embodiment of the present disclosure. Determining the sharpness metrics for the video fields, at 308, may be based on process 400. At 404, edge magnitude values are determined for the pixels in a received video field. Based on the determined edge magnitude values, at 408, a cumulative edge magnitude histogram is generated. At 412, the cumulative edge magnitude histogram is analyzed and the sharpness metric is determined for the video field.

In certain embodiments, only luma values, such as a Y channel of a YCbCr or YC format, for each pixel of the video fields may be used to determine the edge magnitude values. Chroma channels of the video fields are usually softer, therefore using the luma values provide for a more accurate edge magnitude calculation. However, in certain embodiments either the luma values or chroma values, or both values, may be used to determined the edge magnitude values.

In certain embodiments, the edge magnitude value may be determined using any simple edge or difference operator, such as a Sobel or Roberts' Cross operator. These operators may analyze a selected number of lines of the video field at a time to compute the edge magnitude value. For example, the Sobel operator may utilize a 3×3 filter which would require pixels from three lines of the video field.

Generating the cumulative edge magnitude histogram may include generating an edge histogram of the edge magnitude values of the video field. The edge histogram is a count of the number of pixels for each edge magnitude value of the video field. For example, if the edge magnitude values lie between 0 and 255, then the histogram would be a table or list of the number of pixels for each of the edge magnitude values between 0 and 255. The edge magnitude values may be of any range. The table would have 256 entries and a sum of the entries of the edge histogram would equal the number of pixels in the video field.

In certain embodiments, the edge histogram may be generated by initializing all the edge magnitude value entries in the table to zero and then incrementing a corresponding edge magnitude value entries for each pixel of the video field based on the determined edge magnitude value for each of the pixel in the video field. The histogram may be stored using on-chip static RAMs in the video processing circuitry 200. However, any type of non-transitory storage medium may be used to store the histogram, such as buffers, RAM, non-volatile memory, hard disks or other data storage mediums.

Once an edge histogram is generated for a video field, the cumulative edge magnitude histogram may be generated from the edge histogram. The cumulative edge magnitude histogram contains entries for each edge magnitude value. Each entry is the sum of all the edge histogram values for edge magnitude values less than or equal to the edge magnitude value of the selected entry. The last entry of the cumulative edge magnitude histogram is the number of pixels in the video field. Each entry of the cumulative edge magnitude histogram may be represented mathematically as, $$Y(n) = \sum_{k=0}^{k=n} X(k) \qquad (1)$$

where $Y(n)$ represents an $n^{th}$ cumulative edge magnitude histogram value (corresponding to the edge magnitude value n) and $X(n)$ represents an $n^{th}$ edge histogram entry. The cumulative edge magnitude histogram is a non-decreasing function where $Y(n)$ is greater than or equal to $Y(n-1)$.

The cumulative edge magnitude histogram may be generated by setting a first entry of the cumulative edge magnitude histogram to the first entry of the edge histogram. A next entry of the cumulative edge magnitude histogram is a sum of the previous entry of the cumulative edge magnitude histogram combined with the edge histogram value of the current edge magnitude value. This is repeated for each entry of the cumulative edge magnitude histogram until the last entry of the cumulative edge magnitude histogram. In certain embodiments, the cumulative edge magnitude histogram may be stored separately in its own non-transitory storage medium. However, the cumulative edge magnitude histogram may be generated in-place, which means that the cumulative edge magnitude histogram may be generated in the same memory as the edge histogram by replacing the entries of the edge histogram as the entries of the cumulative edge magnitude histogram are being generated. In certain embodiments, determining the edge magnitude values, and generating the edge histogram, and the cumulative edge magnitude histogram may be performed in an inactive time between two video fields. The inactive time may be a time between when the video fields need to be displayed or between times when they are received by video processor circuitry 200.

In certain embodiments, determining the sharpness metric based on the cumulative edge magnitude histogram may include comparing the entries of the cumulative edge magnitude histogram with a programmable threshold, which may be pre-determined or selected during the process. The programmable threshold is set to a percentage of the total number of pixels in the video field. The comparison starts from the first entry of the cumulative histogram and proceed sequentially. Since each entry of the cumulative edge magnitude histogram is the total number of pixels with edge magnitude values less than or equal to the edge magnitude value of the entry, the first entry which exceeds the threshold is used as an indicator of the sharpness of the video field, and is determined as the metric of the video field's sharpness, the sharpness metric. The sharper the video field is the higher the sharpness metric will be. The sharpness metric for the video field may then be stored in non-transitory memory of video processor circuitry 200. In some instances, a history of sharpness metrics may be stored. For example, the history of sharpness metrics for a sequential set of video fields may be stored. Multiple sets of sequential video fields may also be stored.

In certain embodiments, the edge magnitude value for every pixel in the video field may be determined. However, edge magnitude values may be determined only for a select set of pixels in the video field. The edge histogram and the cumulative edge magnitude history may represent only the select set of pixels of the video field and the entries and the values would be modified accordingly to consider only the select set of pixels. In some instances, the select set of pixels may be only pixels that are in motion. These pixels may be interpolated spatially, whereas pixels not in motion are typically copied from neighboring video fields during prior processing and may result in an artificially larger sharpness metric value. In certain embodiments, the select set of pixels may be a subset of the total pixels in the video field. This may reduce the number of pixels that have to be analyzed and processed, which saves power, and may improve performance without sacrificing accuracy of the sharpness metric.

Figure 5:
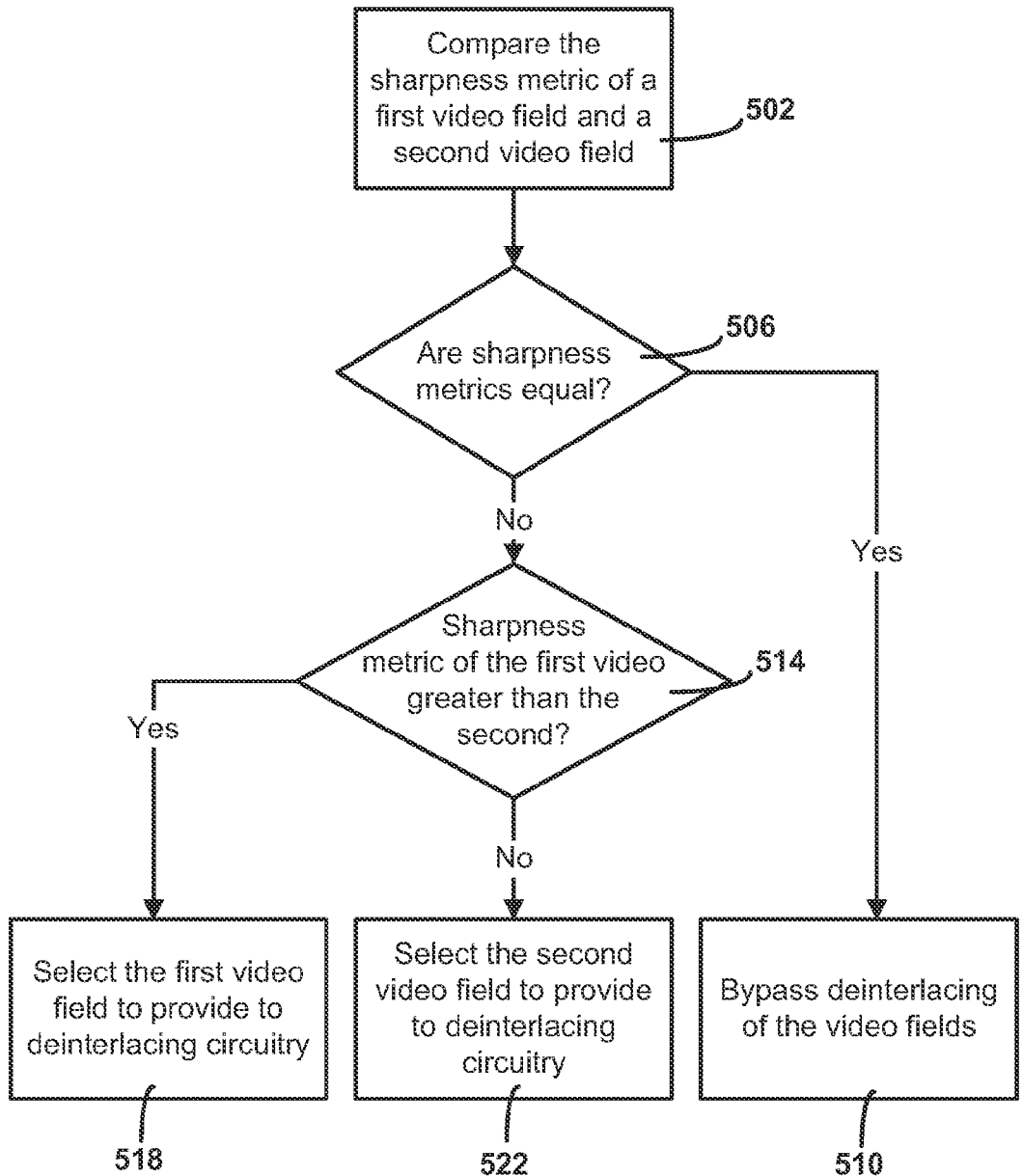
FIG. 5 shows an illustrative process for selecting a video field to provide to a de-interlacer according to another embodiment of the present disclosure.

FIG. 5 shows an illustrative process 500 for selecting a video field to provide to a de-interlacer according to another embodiment of the present disclosure. The comparison of the sharpness metrics at 312 and the determination of the video field source at 316 may be described by process 500 of selecting a video field to provide to a de-interlacer.

Once sharpness metrics are determined for the video fields, at 502, the sharpness metrics for multiple video fields may be compared. At 506, if the sharpness metrics for the video fields are equal, then the video fields are determined to have a high sharpness and, at 510, the video processing circuitry may bypass processing of the video fields using de-interlacer circuitry 216. This indicates that the received digital video input 220 was processed properly and that re-processing and de-interlacing of the video may not be required. This may indicate that the original source of the video was from a film camera or originally created as progressive.

However if the sharpness metrics are not equal, then, at 415, the sharpness metrics for the compared video fields may be checked to see whether one video field has a greater sharpness metric than the other video field. This may indicate that one of the video fields was generated and processed previously. For example, one of the video fields may be an interpolated field from an interlaced video. The missing field of the interlaced video may have been interpolated from the originally produced video field, such as from a video camera source. The video field that has the larger sharpness metric may be determined to be from the original video source, whereas the video field with the smaller sharpness metric may be determined to be the generated or interpolated video field. At 518 and 522, whichever video field has the larger sharpness metric maybe provided to de-interlacing circuitry 216 to be processed and de-interlaced to produce higher quality and sharper video fields.

In certain embodiments, the comparison of the sharpness metrics may be based on comparing whether the sharpness metrics are different by a pre-determined sharpness metric threshold. By using a sharpness metric threshold, video fields that have sharpness metrics close to each other may not have to be processed or de-interlaced. In certain embodiments, the sharpness metrics may be compared to another sharpness metric barrier threshold. In certain cases, if the sharpness metrics of both video fields are relatively high, then it may be determined that both video fields are sharp and were processed properly, and further processing may not be required.

In certain embodiments, a history of sharpness metrics may be compared to each other. For example, a pre-determined set of sharpness metrics for sequential video fields may be compared. A pre-determined sharpness severity threshold may be used to determine whether a video field has a high sharpness or a low sharpness metric. Based on the pattern of the sharpness metrics for the video fields, the interpolated or generated video fields may be determined and the video fields from the original source may also be determined. For example, if the sharpness metrics for four video fields is determined to be of a high-low-high-low pattern, then a second and fourth video field may be determined to be the generated video field and the first and third video field may be determined to be the original video field. The original video field would then be selected to be passed to the de-interlacer.

By comparing multiple sharpness metrics, the reliability of identifying the generated and original video fields can be improved and one-off errors between sharpness metrics of a few video fields may be filtered out. For example, if two sequential video fields have a high-low pattern, then it may be determined that every other video field is generated. However, if we compared a larger set of sequential video fields and see that following video fields are all high, then the low video field may just be a one-off error and every other video field may not actually be generated or be of low sharpness and quality. Though the example describes four video fields, any number of video fields may be compared.

In certain embodiments, the history of sharpness metrics may include the comparison of sets of video fields of the video. For example, different sets of sequential video fields may be compared together to determine which video fields may be generated and which may be from the original video source. By sampling video fields at different locations of the video, the accuracy and reliability of the detection may be improved.

Figure 6:
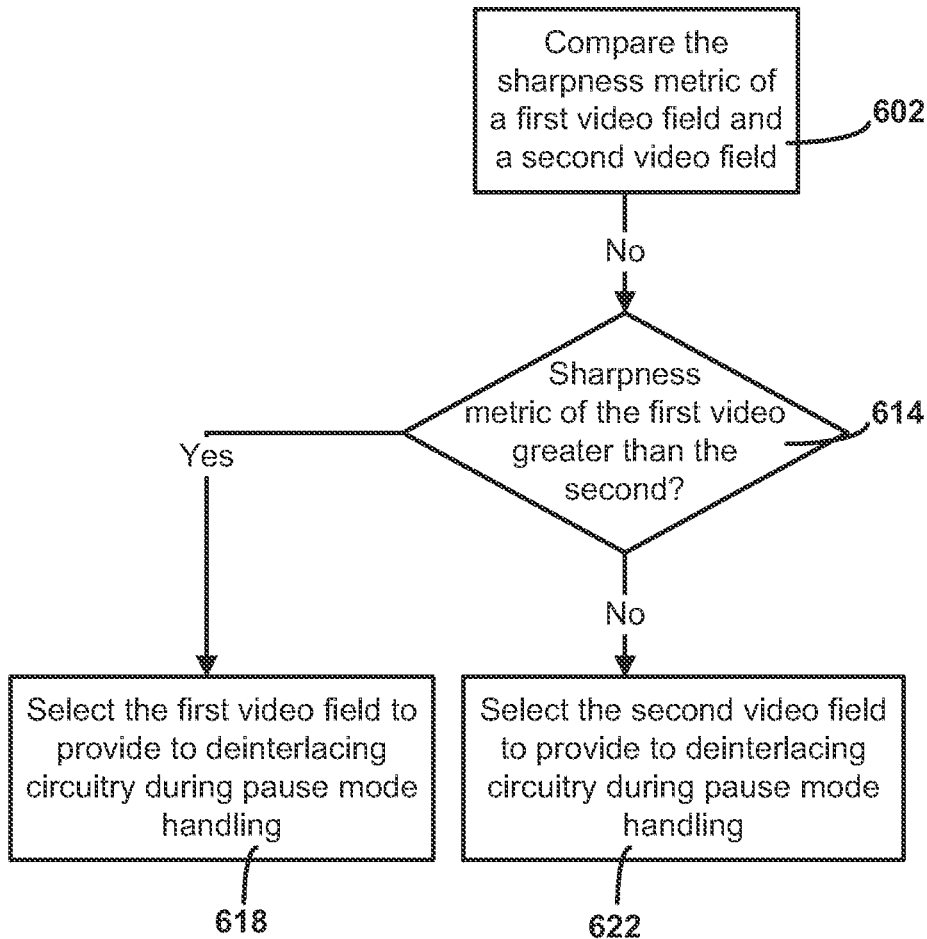
FIG. 6 shows an illustrative process for selecting a video field to provide to a de-interlacer in pause mode handling according to another embodiment of the present disclosure.

FIG. 6 shows an illustrative process 600 for selecting a video field to provide to a de-interlacer in pause mode handling according to another embodiment of the present disclosure. During pause mode handling, the video is paused and the video processor circuitry 200 may receive a set of video fields which continuously alternate as the video is paused. Video processor circuitry 200 will receive two video fields to process for display which correspond to a time instance that the video is paused at. In normal video de-interlacing, the frame motion is zero for the received fields and the de-interlacer may weave the two fields to generate a complete frame. However, this may cause feather and ghosting during the paused mode scenario. Ideally, during pause mode, video processor circuitry 200 should output a constant frame that has a least amount of artifacts. By determining which video field has a higher sharpness, and determining which video field is generated and which is from the original video source, a constant frame which has reduced artifacts and a sharper output can be produced.

At 602, the sharpness metrics for the received video fields may be compared. At 614, it is determined which one of the video fields has the higher sharpness metric. At 618 and 622, the video field with the higher sharpness metric is provided to de-interlacer circuitry 216 for processing during pause mode. The sharper video field is selected to be used by de-interlacer circuitry 216 to generate a static frame, using spatial interpolation. By using a single video field to generate the outputted frame, the output is sharper and flicker may be prevented.

The foregoing is merely illustrative of the principles of this disclosure and various modifications can be made without departing from the scope of the present disclosure. The above described embodiments of the present disclosure are presented for purposes of illustration and not of limitation, and the present disclosure is limited only by the claims which follow.

What is claimed is:

1. A method for detecting sharpness among video fields, the method comprising:
    receiving, using video processing circuitry, a plurality of video fields;
    generating a cumulative histogram of edge magnitude values for each of the plurality of video fields;
    determining, using the video processing circuitry, a sharpness metric for each of the plurality of video fields based on the cumulative histogram for each of the plurality of video fields, wherein the sharpness metric is a magnitude value at which a number of pixels in the cumulative histogram exceeds a pre-determined number of pixels;
    comparing, using the video processing circuitry, the sharpness metric of a first video field to the sharpness metric of a second video field among the plurality of video fields; and
    determining, using the video processing circuitry, a video field source of the first video field and the second video field based on the comparing.

2. The method of claim 1, wherein generating a cumulative histogram of edge magnitude values comprises:
    determining for at least one pixel in each of the plurality of video fields, an edge magnitude value;
    generating an edge magnitude histogram for each of the plurality of video fields based on the edge magnitude value of the at least one pixel in each of the plurality of video fields; and
    generating a cumulative histogram for each of the plurality of video fields, based on the edge magnitude histogram for each of the plurality of video fields.

3. The method of claim 2, wherein generating the cumulative histogram for each of the video fields is based on pixels that are in motion.

4. The method of claim 1, wherein determining the video field sources comprises:
    determining a sharpness metric pattern based on the sharpness metric for each of the plurality of video fields; and
    determining the video field source based on the sharpness metric pattern.

5. The method of claim 4, wherein determining a sharpness metric pattern comprises determining a sharpness quality for each of the plurality of video fields based on comparing the sharpness metric for each of the plurality of video fields to at least one pre-determined difference threshold.

6. The method of claim 1, wherein the sharpness metric is based on luma values for each of the plurality of video fields.

7. The method of claim 1, further comprising:
    selecting, using the video processing, a video field to provide to a de-interlacer for deinterlacing the plurality of video fields based on the video source of the first video field and the second video field.

8. The method of claim 7, wherein selecting the video field to provide to the de-interlacer comprises:
    determining which video field between the first video field and the second video field has a greater sharpness metric based on the comparing; and
    selecting the determined video field with the greater sharpness metric to provide to the de-interlacer.

9. The method of claim 7, wherein selecting the video field to provide to the de-interlacer comprises:
    determining whether the sharpness metric of the first video field and the sharpness metric of the second video field are equal; and in response to determining that the sharpness metrics for the first video field and the second video field are equal, bypassing the de-interlacer for deinterlacing the plurality of video fields.

10. A system for detecting sharpness among video fields, the system comprising:
 video receiving circuitry configured to receive a plurality of video fields;
 sharpness metric circuitry configured to:
  generate a cumulative histogram of edge magnitude values for each of the plurality of video fields;
  determine a sharpness metric for each of the plurality of video fields based on the cumulative histogram for each of the plurality of video fields, wherein the sharpness metric is a magnitude value at which a number of pixels in the cumulative histogram exceeds a pre-determined number of pixels; and
 video field source circuitry configured to:
  compare the sharpness metric of a first video field to the sharpness metric of a second video field among the plurality of video fields; and
  determine a video field source of the first video field and the second video field based on the comparing.

11. The system of claim 10, wherein the sharpness metric circuitry is further configured to:
 determine for at least one pixel in each of the plurality of video fields, an edge magnitude value;
 generate an edge magnitude histogram for each of the plurality of video fields based on the edge magnitude value of the at least one pixel in each of the plurality of video fields; and
 generate a cumulative histogram for each of the video fields, based on the edge magnitude histogram for each of the plurality of video fields.

12. The system of claim 11, wherein the cumulative histogram for each of the video fields is based on pixels that are in motion.

13. The system of claim 10, wherein the video field source circuitry is further configured to:
 determine a sharpness metric pattern based on the sharpness metric for each of the plurality of video fields; and
 determine the video field source based on the sharpness metric pattern.

14. The system of claim 13, wherein the video field source circuitry is further configured to:
 determine a sharpness quality for each of the plurality of video fields based on comparing the sharpness metric for each of the plurality of video fields to at least one pre-determined difference threshold.

15. The system of claim 10, wherein the sharpness metric is based on luma values for each of the plurality of video fields.

16. The system of claim 10, the system further comprising:
 video field selection circuitry configured to select a video field to provide to a deinterlacing circuitry for deinterlacing the video fields based on the video source of the first video field and the second video field.

17. The system of claim 16, wherein the video field selection circuitry is further configured to:
 determine which video field between the first video field and the second video field has the greater sharpness metric based on the comparison; and
 select the determined video field with the greater sharpness metric to provide to the deinterlacing circuitry.

18. The system of claim 16, wherein the video field selection circuitry is further configured to:
 determine whether the sharpness metric of the first video field and the sharpness metric of the second video field are equal; and
 bypass deinterlacing of the video fields in response to determining that the sharpness metrics for the first video field and the second video field are equal.

19. The method of claim 1, wherein the comparing the sharpness metric of a first video field to the sharpness metric of a second video field comprises:
 comparing a first cumulative histogram for a first video field among the plurality of video fields to a second cumulative histogram for a second video field among the plurality of video fields.

20. The system of claim 10, wherein the sharpness metric circuitry is further configured to:
 compare a first cumulative histogram for a first video field among the plurality of video fields to a second cumulative histogram for a second video field among the plurality of video fields.

* * * * *